(No Model.) 2 Sheets—Sheet 1.
E. CAREY, H. GASKELL, Jr., & F. HURTER.
PROCESS OF OBTAINING AMMONIA FROM AMMONIUM SULPHATE.
No. 304,260. Patented Aug. 26, 1884.
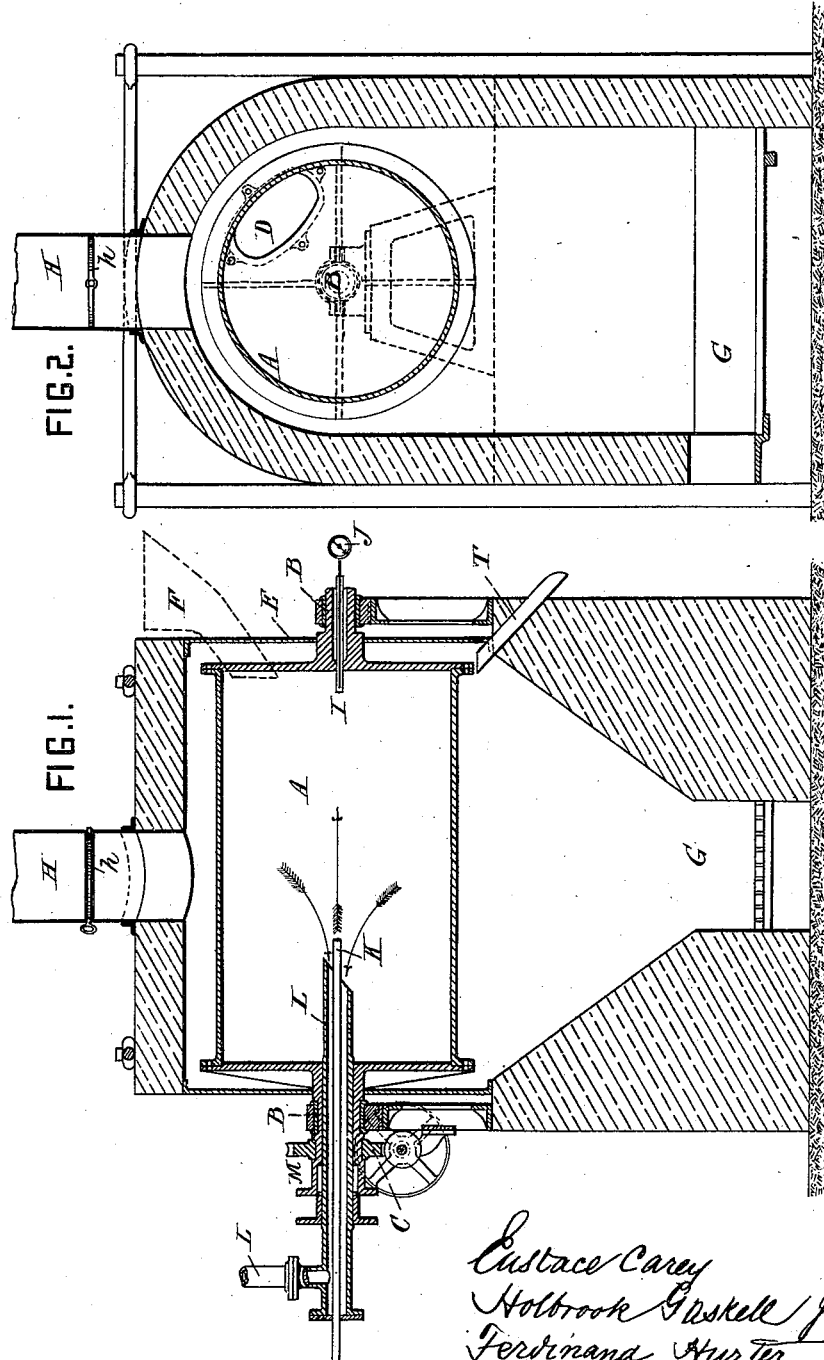

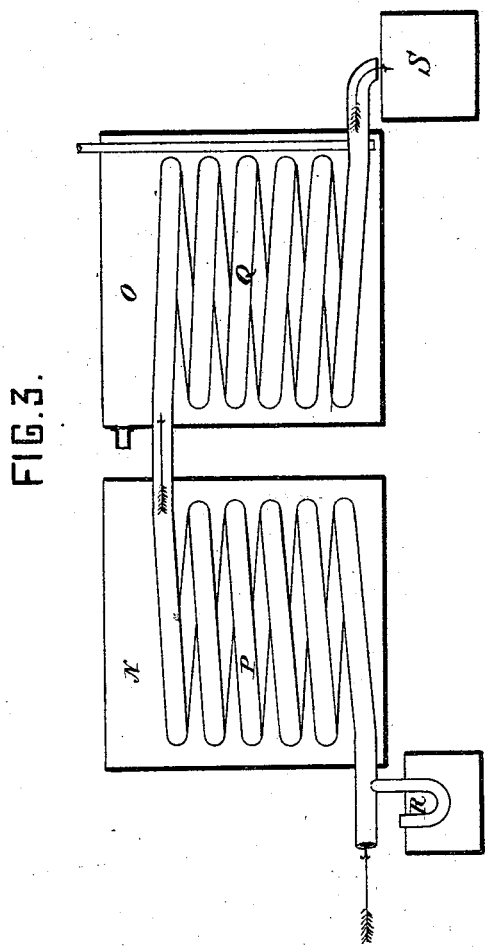

UNITED STATES PATENT OFFICE.

EUSTACE CAREY, HOLBROOK GASKELL, JR., AND FERDINAND HURTER, OF WIDNES, COUNTY OF LANCASTER, ENGLAND.

PROCESS OF OBTAINING AMMONIA FROM AMMONIUM SULPHATE.

SPECIFICATION forming part of Letters Patent No. 304,260, dated August 26, 1884.

Application filed May 10, 1884. (No model.) Patented in England January 25, 1884, No. 2,118.

*To all whom it may concern:*

Be it known that we, EUSTACE CAREY, HOLBROOK GASKELL, the younger, alkali manufacturers, subjects of the Queen of Great Britain and Ireland, and FERDINAND HURTER, Ph. D., a citizen of the Republic of Switzerland, and all residing at Widnes, in the county of Lancaster, England, have invented certain improvements in the treatment of sulphate of ammonia for obtaining the ammonia in the free state and utilizing the sulphuric acid, (for which we have obtained a patent in Great Britain, No. 2,118, dated January 25, 1884,) of which the following is a specification.

In carrying our invention into effect we mix intimately (either in solution or by grinding) the sulphate of ammonia with one or more equivalents of sulphate of soda. If the salts be in solution, we evaporate to dryness and heat the dry salts to a temperature sufficient to decompose the ammonium sulphate, which temperature we find may be about 700° Fahrenheit, the ammonia passing off as free ammonia, the sulphuric acid remaining combined with sodium sulphate, forming hydrogen, sodium sulphate, or bisulphate. The reaction is incomplete unless a current of steam be passed over or through the semi-fluid salts. We conduct this process in vessels heated from outside and provided with apertures for charging and discharging and for admitting steam, and for the escape of the ammonia vapors, which we condense or absorb by means of water or otherwise. The residual hydrogen sodium sulphate we utilize in any well-known manner, either for the production of sulphuric anhydride, or we heat it with common salt for the purpose of obtaining hydrochloric acid and neutral sulphate of soda. The sulphate of soda and ammonia so produced may, with the addition of carbonic acid, be used for the purpose of producing carbonate of soda and sulphate of ammonia.

Many forms of apparatus may be employed for the purpose of carrying out our invention. We find the apparatus hereinafter described, and illustrated in the accompanying drawings, to be sufficient for the purpose.

Figure 1 is a longitudinal section, and Fig. 2 is a transverse section of the apparatus, and Fig. 3 illustrates the condensing apparatus.

A cast-iron cylinder, A, capable of revolving on trunnions B, is driven by any suitable gearing, such as by a worm-wheel and pulley, as shown at C. The revolving cylinder A is provided at one end close to the circumference with a door, D, through which the charge is introduced into the cylinder when the door is uppermost, and withdrawn when it is at its lowest position. A movable iron plate, E, serves as a screen to prevent loss of heat and to allow access to the door. The plate and door being removed, a funnel is inserted (as shown at F in Fig. 1) through which the charge of mixed sulphate of ammonia and sulphate of soda may be introduced. When the cylinder is charged and the funnel removed, the door D is fastened gas-tight and the plate E is replaced. Heat is applied to the cylinder A, which is then slowly rotated.

For the purpose of heating the cylinder A, it is surrounded by brick-work (strengthened by iron binding in the usual manner) or contained in any suitable inclosure, and a furnace is placed at G below it. We have indicated an ordinary fire-place at G; but generally we prefer to use gas for heating the cylinder. The products of combustion pass away from the furnace by the chimney H, which is provided with a damper, h, by which the draft may be regulated. In order to ascertain the temperature in the interior of the cylinder A, an iron pipe, I, passes through one of the trunnions, into which may be placed any suitable pyrometer, J. When the temperature is so high that steam will not condense, steam is introduced through the pipe K, passing through the pipe L into the interior of the cylinder. Ammonia will now be evolved and pass away together with the steam through the pipe L to the condensing apparatus. In order to prevent leakage of gas, the pipe L passes through a stuffing-box, M. The end of the pipe L within the cylinder is preferably cut off at an angle, as shown, in order to prevent stoppage by portions of the contents of the cylinder dropping into the opening. The gas is led away by the pipe L to the condensing apparatus, which consists of two vessels, N and O, which are traversed by worms P and Q. The gas passes through these worms from the pipe L in the direction indicated by arrows. Both the vessels N and O are filled with water or (if the heat is to be utilized) by saline solutions. The temperature in the first vessel is kept at nearly boiling-point in order that only ammonium salts, such as sulphate and chloride (if any) may condense and flow out as solution by the lute R. The water surrounding the worm Q must be kept cool, so as to condense completely both the steam and the ammonia, and the amount of steam introduced into the cylinder A can be so regulated as to give at once a solution of ammonia of the desired strength, which solution collects in the receptacle S; or, if it is desired to obtain ammonia in a gaseous state, the worm Q may be omitted, the worm P being made sufficiently long and kept at such a temperature as will effect the condensation of the steam with the smallest practicable condensation of the ammonia. When all the ammonia is driven off from the charge, the cylinder A may be emptied by removing plate E and door D, and then by turning the door to its lowest position the contents will flow out onto a chute, T, and be conducted to any suitable vessel.

Having now particularly described and ascertained the nature of our said invention and in what manner the same is to be performed, we declare that what we claim is—

The treatment of sulphate of ammonia by subjecting the same, in conjunction with sulphate of soda, to an elevated temperature, so as to obtain ammonia and bisulphate of soda, in which latter form the sulphuric acid may be utilized for many purposes.

In testimony whereof we have signed our names to this specification in the presence of two subscribing witnesses.

EUSTACE CAREY.
HOLBROOK GASKELL, JR.
FERDINAND HURTER.

Witnesses:
PALGRAVE SIMPSON,
  *Solicitor, Water Street, Liverpool.*
FREDERIC NORTH,
  *Solicitor, Liverpool.*